US012382227B2

(12) United States Patent
Zou et al.

(10) Patent No.: US 12,382,227 B2
(45) Date of Patent: Aug. 5, 2025

(54) CAPACITIVE MEMS MICROPHONE, MICROPHONE UNIT AND ELECTRONIC DEVICE

(71) Applicant: GOERTEKMICROELECTRONICS CO., LTD., Shandong (CN)

(72) Inventors: Quanbo Zou, Shandong (CN); Maoqiang Dang, Shandong (CN); Dexin Wang, Shandong (CN)

(73) Assignee: GoertekMicroelectronics Co. Ltd., Shandong (CN)

( * ) Notice: Subject to any disclaimer, the term of this patent is extended or adjusted under 35 U.S.C. 154(b) by 222 days.

(21) Appl. No.: 18/010,907

(22) PCT Filed: Jun. 30, 2020

(86) PCT No.: PCT/CN2020/099425
§ 371 (c)(1),
(2) Date: Dec. 16, 2022

(87) PCT Pub. No.: WO2021/253499
PCT Pub. Date: Dec. 23, 2021

(65) Prior Publication Data

US 2023/0353951 A1 Nov. 2, 2023

(30) Foreign Application Priority Data

Jun. 16, 2020 (CN) ........................ 202010548789.X

(51) Int. Cl.
*H04R 19/04* (2006.01)
*H04R 1/04* (2006.01)

(52) U.S. Cl.
CPC ............... *H04R 19/04* (2013.01); *H04R 1/04* (2013.01); *H04R 2201/003* (2013.01)

(58) Field of Classification Search
CPC ..... H04R 1/04; H04R 19/04; H04R 2201/003
See application file for complete search history.

(56) References Cited

U.S. PATENT DOCUMENTS

| | | | |
|---|---|---|---|
| 10,129,651 B2 * | 11/2018 | Zhang | B81B 3/0051 |
| 10,390,145 B1 * | 8/2019 | Hsieh | H04R 19/04 |
| 2006/0280319 A1 | 12/2006 | Wang et al. | |
| 2015/0014797 A1 * | 1/2015 | Schelling | H04R 19/005 257/416 |
| 2018/0352339 A1 | 12/2018 | Piechocinski et al. | |

FOREIGN PATENT DOCUMENTS

| | | |
|---|---|---|
| CN | 110351641 A | 5/2018 |
| CN | 108367908 A | 8/2018 |

* cited by examiner

*Primary Examiner* — Suhan Ni
(74) *Attorney, Agent, or Firm* — Baker Botts LLP

(57) ABSTRACT

Disclosed in embodiments of the present disclosure are a capacitive MEMS microphone, a microphone unit and an electronic device. The capacitive MEMS microphone includes: a back electrode plate; a diaphragm; and a spacer for separating the back electrode plate from the diaphragm, wherein in a state where no operating bias is applied, at least a portion of the diaphragm is pre-deviated in a direction away from the back electrode plate relative to a flat position.

9 Claims, 6 Drawing Sheets

CAPACITIVE MEMS MICROPHONE, MICROPHONE UNIT AND ELECTRONIC DEVICE

CROSS-REFERENCE TO RELATED APPLICATIONS

This application is a National Stage of International Application No. PCT/CN2020/099425, filed on Jun. 30, 2020, which claims priority to Chinese Patent Application No. 202010548789.X, filed on Jun. 16, 2020, both of which are hereby incorporated by reference in their entireties.

TECHNICAL FIELD

The present disclosure relates to the field of a capacitive MEMS (micro-electro-mechanical system) microphone, and in particular to a capacitive MEMS microphone, a microphone unit and an electronic device.

BACKGROUND

A MEMS (micro-electro-mechanical system) microphone is a microphone chip manufactured with MEMS technology, which is small in size and can be widely used for various electronic devices, such as mobile phones, tablets, monitoring devices, wearable devices, etc.

The capacitive MEMS microphone is in a dual-ends capacitor structure. FIG. 1 shows the structure of a capacitive MEMS microphone. As shown in FIG. 1, the capacitive MEMS microphone includes a back electrode plate 11, a diaphragm 12, and a spacer 13 located between the back electrode plate 11 and the diaphragm 12. The spacer 13 is used for separating the back electrode plate 11 from the diaphragm 12. The spacer 13 may be a separate spacing layer, or a part of the chip substrate.

In FIG. 1, the back electrode plate 11, the diaphragm 12 and the spacer 13 enclose a back cavity 15 of the capacitive MEMS microphone. A hole 14 in communication with the back cavity 15 may be formed in the back electrode plate 11. A vent hole (not shown) may also be formed in the diaphragm 12.

As shown in FIG. 2, under an operating bias, the diaphragm 12 bends toward the back electrode plate 11. In order to ensure the mechanical linear performance of the diaphragm 12, under a condition that the operating bias is applied, the diaphragm 12 has a low static deflection when it is in a stationary state, that is, the ratio of a static effective displacement (static effective deflection) of the diaphragm 12 relative to a flat position to the thickness of the diaphragm 12 is $W_0/t$ which is less than 0.5, wherein $W_0$ is the effective displacement of the diaphragm 12 in the stationary state under the operating bias, and t is the thickness of the diaphragm 12.

The diaphragm 12 of FIG. 2 is configured to have great stiffness so that the diaphragm 12 has low static deflection. This diaphragm is less sensitive.

Therefore, there is a need to provide a new capacitive MEMS microphone.

SUMMARY

Embodiments of the present disclosure provides a new technical solution for a capacitive MEMS microphone.

According to a first aspect of the present disclosure, a capacitive MEMS microphone is provided, including: a back electrode plate; a diaphragm; and a spacer for separating the back electrode plate from the diaphragm, wherein in a state where no operating bias is applied, at least a portion of the diaphragm is pre-deviated in a direction away from the back electrode plate relative to a flat position.

According to a second aspect of the present disclosure, a microphone unit is provided, including a unit shell, a capacitive MEMS microphone disclosed herein and an integrated circuit chip, wherein the capacitive MEMS microphone and the integrated circuit chip are provided in the unit shell.

According to a third aspect of the present disclosure, an electronic device is disclosed, comprising a microphone unit disclosed herein.

In various embodiments, it is possible to reduce the overall non-linearity of the microphone by using a diaphragm with a great static deflection.

It should be understood that the above general description and the following detailed description are only exemplary and explanatory, and are not intended to limit the embodiments of the present specification.

In addition, there is no need for any one of the embodiments of the present disclosure to achieve all the above-mentioned effects.

Other features and advantages of the present disclosure will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, the drawings required in the description of the embodiments or the prior art will be briefly described below. It will be apparent that the drawings in the following description are only some of the embodiments described in the embodiments of the present disclosure, and other drawings can be obtained by those skilled in the art according to these drawings.

DETAILED DESCRIPTION

Figure 1:
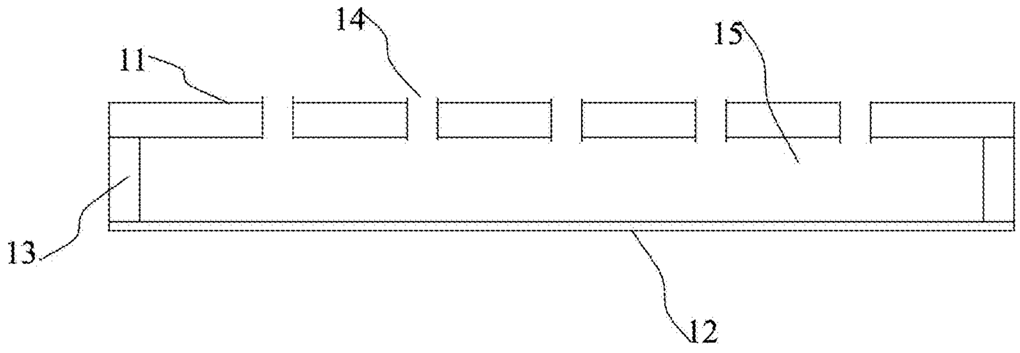
FIG. 1 shows a schematic diagram of a micro-electro-mechanical microphone of the prior art.
Figure 2:
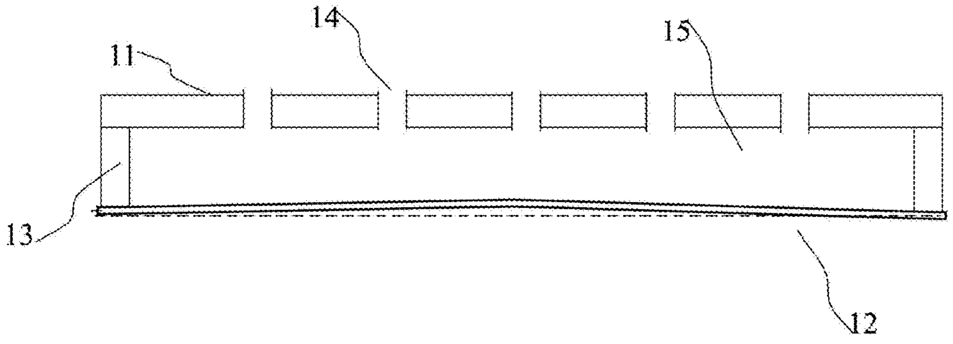
FIG. 2 shows the schematic diagram of the micro-electro-mechanical microphone of in the prior art, wherein the diaphragm has a low static deflection in a state where the operating bias is applied.

Various exemplary embodiments of the present disclosure will now be described in detail with reference to the accompanying drawings.

The following description of at least one exemplary embodiment is in fact merely illustrative and is in no way intended to constitute any limitation to the present disclosure and its application or use.

It should be noted that similar reference numerals and letters denote similar items in the accompanying drawings, and therefore, once an item is defined in a drawing, and there is no need for further discussion in the subsequent accompanying drawings.

In the following, different embodiments and examples of the present disclosure are described with reference to the accompanying drawings.

Figure 5:
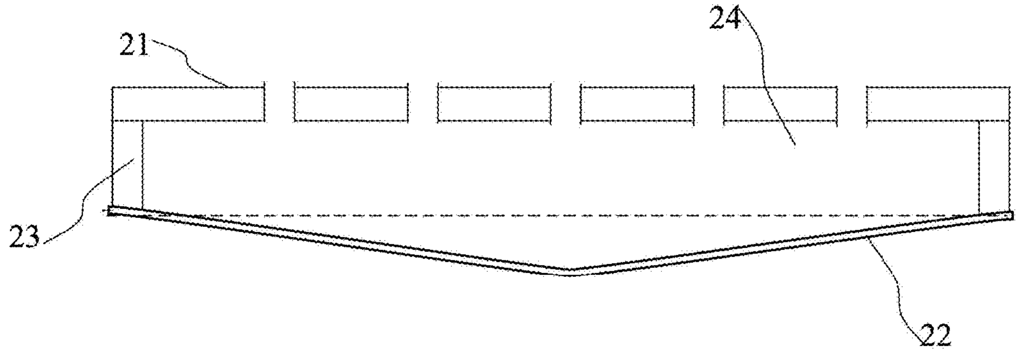
FIG. 5 shows a schematic diagram of a capacitive MEMS microphone according to one embodiment disclosed herein.

Here, a capacitive MEMS microphone is provided. As shown in FIG. 5, the capacitive MEMS microphone includes a back electrode plate 21, a diaphragm 22 and a spacer 23. The spacer 23 is used to separate the back electrode plate 21 from the diaphragm 22. The spacer 23 may be a separate spacing layer, or a part of the chip substrate.

FIG. 5 shows the case where no operating bias is applied to the diaphragm 22. In a state where the operating bias is not applied, at least a portion of the diaphragm 22 is pre-deviated in a direction (that is, a direction in which the distance between the diaphragm 22 and the back electrode plate 21 is increased) away from the back electrode plate. In FIG. 5, the diaphragm 22 as a whole is pre-deviated. In other embodiments, however, the diaphragm may be divided into multiple parts, and a portion of them may be pre-deviated. Here, pre-deviation refers to a deviated state before the diaphragm works under sound pressure.

The ratio of a first static effective displacement $W_{00}$ of the at least a portion of the diaphragm 22 that is pre-deviated to the thickness t of the diaphragm is greater than or equal to 0.2 and less than or equal to 3, i.e., $0.2<=\leq W_{00}/t\geq 3$.

For example, in the MEMS microphone in FIG. 5, an air gap $G_{00}$ between the flat position shown by the dotted line and the back electrode plate 21 is 1-5 μm, and the thickness t of the diaphragm 22 is 0.1-1.5 μm.

With the pre-deviation setting, it is possible to increase the strength of the diaphragm so as to improve THD (Total Harmonic Distortion) and/or AOP (Acoustic Overload Point).

In addition, since the diaphragm is pre-deviated, it is possible to prevent the diaphragm from being pressed to the back electrode plate to a certain extent when the operating voltage is applied. In addition, the stress for pre-deviation of the diaphragm will also affect the stress distribution of the diaphragm itself. With the pre-deviation, it is possible to manufacture the MEMS microphone with a smaller gap, which makes the fabrication process easier and the device's breakdown voltage VP lower. In addition, this approach may reduce the bias power supply requirements for the MEMS microphone. For example, a standard CMOS voltage below 15V may meet its bias power supply requirements without using a high-voltage BCD (Bipolar-CMOS-DMOS) process, which may reduce the chip area and cost of the MEMS microphone.

Figure 6:
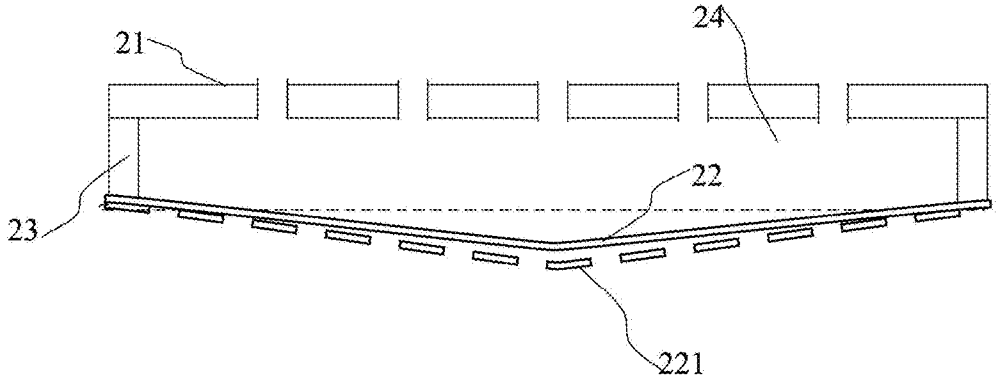
FIG. 6 shows a schematic diagram of the capacitive MEMS microphone according to another embodiment disclosed herein.
Figure 7:
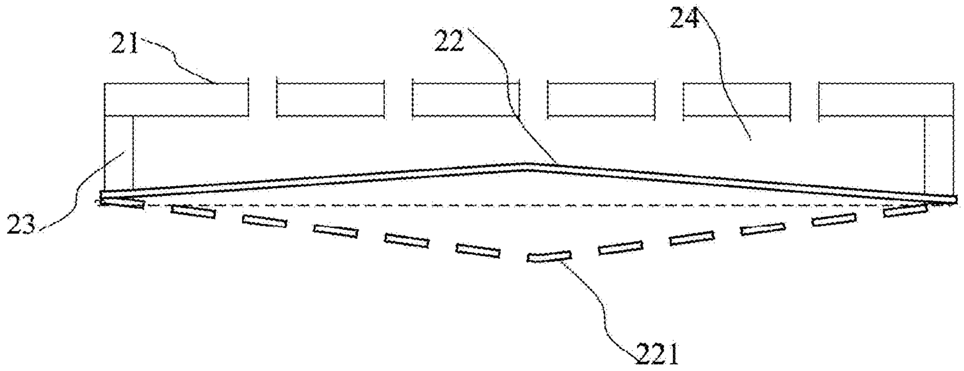
FIG. 7 shows a schematic diagram of the capacitive MEMS microphone according to yet another embodiment disclosed herein.

FIGS. 6 and 7 show two states of the diaphragm 22 with the operating bias applied. As shown in FIG. 6, the diaphragm 22 leaves the original position 221 but is still outside the flat position of the diaphragm shown by the dotted line (away from the back electrode plate 21) with the operating bias applied. In FIG. 7, the diaphragm 22 leaves the original position 221 and is located within the flat position of the diaphragm (near the back electrode plate 21) shown by the dotted line with the operating bias applied.

In the embodiment shown in FIGS. 6 and 7, under the state of applying the operating bias, it is possible to make the ratio of the second static effective displacement of the diaphragm 22 relative to the flat position to the thickness of the diaphragm greater than or equal to 0.5, preferably greater than or equal to 1. Here, "static" refers to a state where no sound pressure is applied.

In this way, it is possible to make the mechanical non-linearity of the diaphragm to a degree that is similar in magnitude but opposite in direction to the non-linearity of capacitance detection, thereby greatly reducing the overall non-linearity of the MEMS microphone to further improve THD and AOP performance.

Next, the working principle and performance of the capacitive MEMS microphone including the back electrode plate 21 and diaphragm 22 shown in FIGS. 6 and 7 will be explained in conjunction with FIGS. 3 and 4. This capacitive MEMS microphone may also be called a dual-end capacitive MEMS microphone. The diaphragm 22 of the capacitive MEMS microphone shown in FIGS. 6 and 7 has a great deflection.

In a capacitive MEMS microphone, the amount of charge is constant (fixed), that is, at audio frequencies, the amount of charge Q=CV is constant, wherein C and V are respectively the capacitance and voltage between diaphragm and back electrode plate. Therefore, the signal output may be expressed as:

$$vo=-x/(1-x)\cdot VB \quad \text{(formula 1)}$$

Here, x=w/G0, is the ratio of the displacement w of the diaphragm 22 to the static air gap $G_0$ between the back electrode plate 21 and the diaphragm 22, and VB is the operating bias between the back electrode plate 21 and the diaphragm 22. The static air gap $G_0$ is the effective static air gap between the diaphragm with the operating bias VB applied and the back electrode plate. VB may represent a bias voltage that enables the diaphragm to be in a desired operating state.

When the output signal is obtained with the capacitance detection between the back electrode plate and the diaphragm, the non-linearity generated by the capacitance detection may be expressed as:

$$|vo^+/vo^-|=[(1-x^-)/(1-x^+)]\cdot(x^+/x^-) \quad \text{(formula 2)}$$

Here, the meanings of vo and x in Formula 2 are as above, and the superscripts + and − correspond to the positive and negative half periods of the sound pressure accepted by the diaphragm, respectively. When the sound pressure is positive, x changes toward the direction in which the air gap G decreases. Formula 2 shows one of the main sources of non-linearity in dual-end capacitive MEMS microphones.

A traditional microphone utilizes the mechanical linearity of the diaphragm, that is, tries to make the displacement w of the diaphragm proportional to the sound pressure p, i.e., $x^-=-x^+$, $x^+=x>0$, wherein for x, the direction towards which the air gap G decreases is positive. At this point, the non-linearity of the microphone may be expressed as:

$$|vo^+/vo^-|=(1+x)/(1-x) \quad \text{(formula 3)}$$

In formula 3, the positive signal output is greater than the negative signal output, and the degree of non-linearity of the microphone is directly related to x.

In addition, the non-linearity of the microphone itself may be expressed as:

$$P=aW+bW^3 \quad \text{(formula 4)}$$

Here, P and W are the total pressure and total displacement received by the diaphragm, and a and b are positive constants.

The static effective displacement (an effective displacement under the operating bias) of the diaphragm in the static state (that is, a state in which the operating bias VB is applied but the sound pressure p is not applied) is $W_0$. Since the operating bias VB is applied between the diaphragm and the back electrode plate of the capacitive microphone, $W_0>0$. When a sound pressure p is applied to the diaphragm, the displacement of diaphragm is $w^+$ in the positive half cycle of the sound pressure p (positive sound pressure), and is $w^-$ in the negative half cycle of the sound pressure p (negative sound pressure), and $w^+$ is slightly lower than $w^-$.

Formula 4 may also be expressed as:

$$p+P_0=a(W_0+w)+b(W_0+w)^3 \quad \text{(formula 5)}$$

Here, p is the sound pressure (with positive and negative half cycles), P0>0 is the static pressure generated by the electrostatic force, and w is an additional displacement of the diaphragm generated by the sound pressure (can be a positive or negative value).

Figure 3:
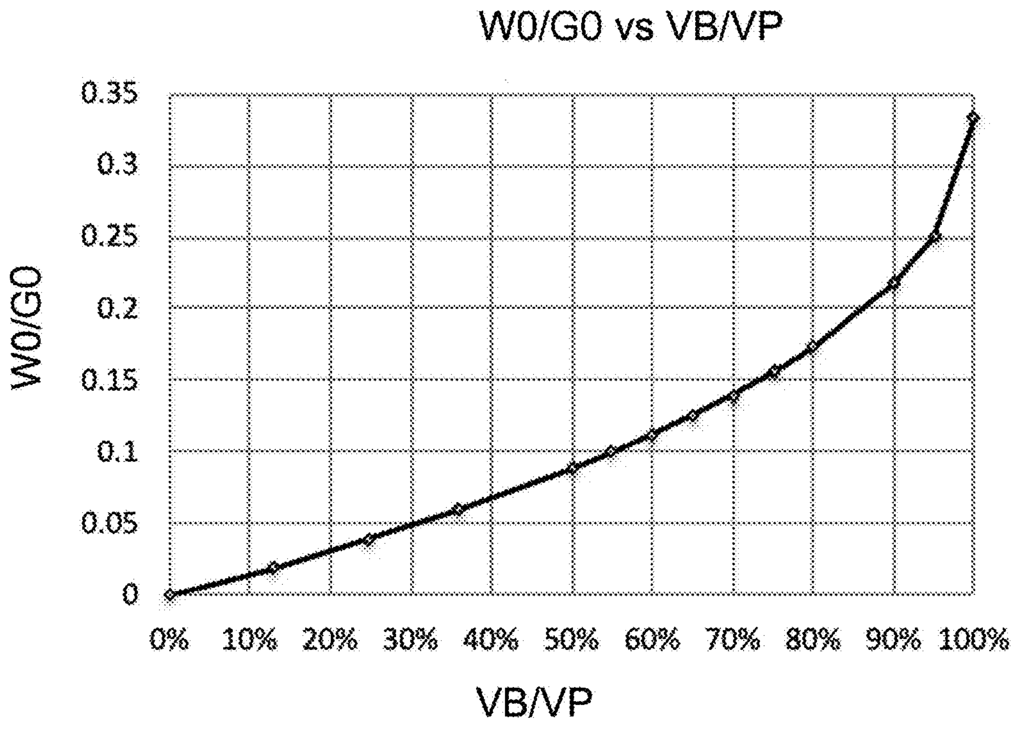
FIG. 3 shows a graph of the effective displacement of the diaphragm in a static state versus an operating bias.

FIG. 3 shows the relationship between the static effective displacement $W_0$ and the operating bias VB. In FIG. 3, the abscissa is VB/VP, wherein VP indicates the breakdown voltage of the microphone, and the ordinate is $W_0/G_0$. In order to ensure the reliability of microphone devices, VB/VP<75% is usually set, and the corresponding $W_0/G_0$ is about 16%. By setting VB, it is possible to adjust the static deflection of the diaphragm 22, or adjust the ratio $W_0/t$ of the static effective displacement $W_0$ of the diaphragm 22 relative to the flat position to the thickness t of the diaphragm.

In a traditional capacitive MEMS microphone, in order to pursue mechanical linearity, it is necessary to select a diaphragm which has a low static deflection at a static state (no sound pressure is applied), or the ratio $W_0/t$ of the static effective displacement $W_0$ of the diaphragm 22 relative to the flat position to the thickness t of the diaphragm is equal to or lower than 0.5. The non-linearity of this microphone mainly comes from capacitance detection.

Here, it is proposed to counteract the non-linearity of the capacitance detection by increasing the static deflection of the diaphragm.

Specifically, considering the above formulas 1-5, the overall non-linearity of the capacitive MEMS microphone may be expressed as:

$$|vo^+/vo^-|=A\cdot B \quad \text{(formula 6)}$$

Here, $A=(1-x-)/(1-x+)\sim(1+x)/(1-x)>1$, $B=(x^+/x^-)=[a+3b(W_0+w^-)2]/[a\pm 3b(W_0\pm w^+)^2]$ $\sim[a+3b(W_0-w)]/[a+3b(W_0+w)]<1$, wherein $w^+=w\sim-w->0$ If the non-linearity of the capacitive MEMS microphone is considered comprehensively, it can be found in formula 6 that A is larger than 1 and B is lower than 1. Therefore, by adjusting A or B, it is possible to reduce the non-linearity caused by the asymmetry of the positive and negative cycles of the signal output, thereby improving THD (Total Harmonic Distortion) and AOP (Acoustic Overload Point).

In the present disclosure, with the operating bias VB and/or pre-deviation, it is possible to adjust "pre-deviation amount" (static deflection of the diaphragm) such that $W_0/t\geq 0.5$, preferably $W_0/t\geq 1$. This pre-deviation allows A in Formula 6 to be at least partially neutralized by B, thereby improving the degree of non-linearity of the output signal or the sound pressure level at a certain degree of non-linearity. For example, it is possible to significantly improve a sound pressure level of THD of 1% or AOP at THD of 10%.

Figure 4:
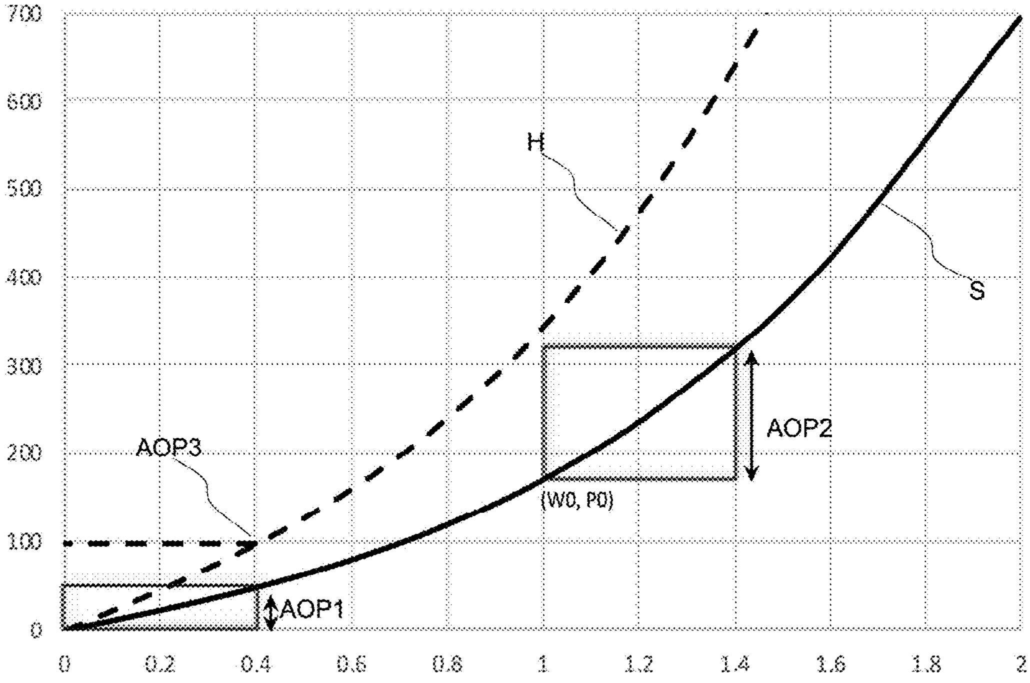
FIG. 4 shows a schematic diagram of the acoustic overload point of the diaphragm.

FIG. 4 shows the relationship between pre-deviation amount and AOP. In FIG. 4, the abscissa indicates the ratio $W_0/t$ of the static deflection of the diaphragm to the thickness of the diaphragm, and the ordinate indicates the static pressure $P_0$. In FIG. 4, the solid line indicates properties of a soft diaphragm S, and the dashed line indicates properties of a hard diaphragm H. As shown in FIG. 4, the diaphragm S has a low AOP1 when the initial static deflection of diaphragm S is low. If the hard diaphragm H is used, the diaphragm H has a low AOP3 at a low static deflection. The hard diaphragm H, however, may have a reduced sensitivity. When the static deflection of the diaphragm S is set large, for example, when the static deflection of the diaphragm S is set at a point corresponding to $(W_0, P_0)$, AOP2 of the diaphragm S is significantly increased relative to AOP1. In this way, it is possible to improve performances such as AOP while retaining the advantages (e.g., sensitivity) of the soft diaphragm.

Here, with the pre-deviation, it is possible to cause the diaphragm to be in a state of great deflection in advance. As shown in FIG. 6, when the operating voltage is applied, the diaphragm 22 moves toward the back electrode plate 21, but it is still outside the flat position shown in the dotted line. In addition, as shown in FIG. 7, it is possible to place the diaphragm 22 within the flat position shown by the dotted line by applying the operating bias. In the case of applying the operating voltage, the diaphragms shown in FIGS. 6 and 7 have increased deflection. In this way, it is possible to artificially introduce the mechanical (geometric) non-linearity of diaphragm, that is, the asymmetry of the mechanical response of sound pressure in the positive and negative half cycles. The deformation of the diaphragm is $w^+$ when a positive sound pressure is applied (being pressed towards the back electrode plate), and is $w^-$ when a negative sound pressure is applied (away from the back electrode plate), and w+ is lower than w−. This can compensate for the non-linearity introduced by the capacitance detection, that is, the output signal may be indicated as $v_{out}\sim -x/(1-x)VB$, wherein $x=w/G_0$, w is the displacement of the diaphragm caused by the sound pressure, $G_0$ is the effective static air gap when an operating bias is applied and the sound pressure is not applied, and VB is operating bias. Under a positive sound pressure, x>0, and the output signal is greater than x*VB; and under a negative sound pressure, the output signal is lower than x*VB. Considering $w+/w-\sim(1-x)/(1+x)$ at a specific sound pressure level, it is possible to use the mechanical non-linearity of diaphragm to compensate for the non-linearity caused by the capacitance detection, thereby improving the THD and AOP of a capacitive MEMS microphone.

At least a portion of the diaphragm may be pre-deviated by a stress structure. FIGS. 8-12 show a pre-deviated embodiment.

Figure 8:
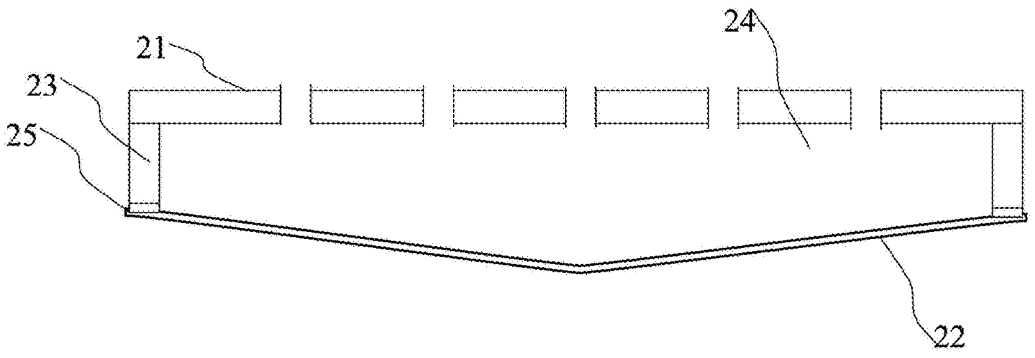
FIG. 8 shows a schematic diagram of the capacitive MEMS microphone according to yet another embodiment disclosed herein.

In the embodiment shown in FIG. 8, the stress structure is realized by a stress ring 25 disposed at the periphery of the diaphragm. The stress ring 25 may include a tensile stress ring and/or a compressive stress ring. For example, the diaphragm 22 made of free polysilicon is provided with a tensile stress silicon nitride film ring at the inner periphery (the periphery at a side near the back electrode plate 21) and/or a compressive stress film ring at the outer periphery (the periphery at a side near the back electrode plate 21).

Figure 9:
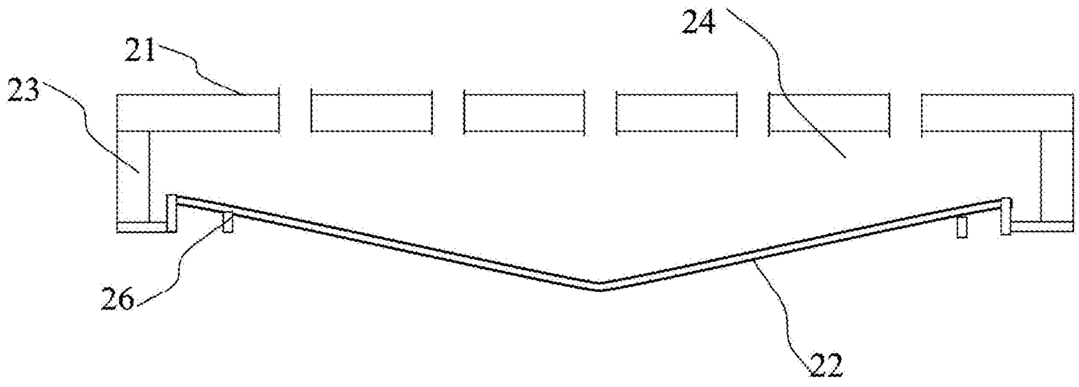
FIG. 9 shows a schematic diagram of the capacitive MEMS microphone according to yet another embodiment disclosed herein.

In the embodiment shown in FIG. 9, the stress structure is realized by a corrugated membrane 26 arranged at the periphery of the diaphragm. By setting different orientations of the corrugated membrane, it is possible to provide different stresses to the diaphragm 22. For example, the tensile stress may be provided by textures facing the inside (towards the back electrode plate 21), and the compressive stress may be provided by textures facing the outside.

Figure 10:
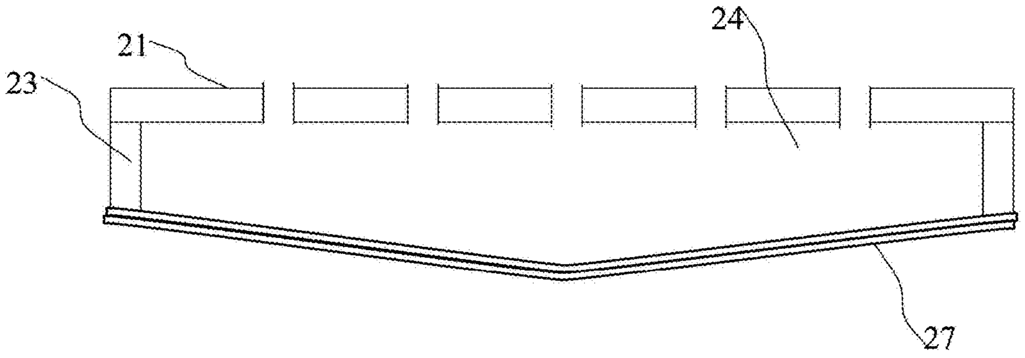
FIG. 10 shows a schematic diagram of the capacitive MEMS microphone according to yet another embodiment disclosed herein.

In the embodiment shown in FIG. 10, the stress structure is realized by a complex membrane structure 27 arranged at the diaphragm. For example, the complex membrane structure 27 shown in FIG. 10 include an inner membrane having a compressive stress and an outer membrane having a tensile stress such that that the diaphragm is pre-deviated.

Figure 11:
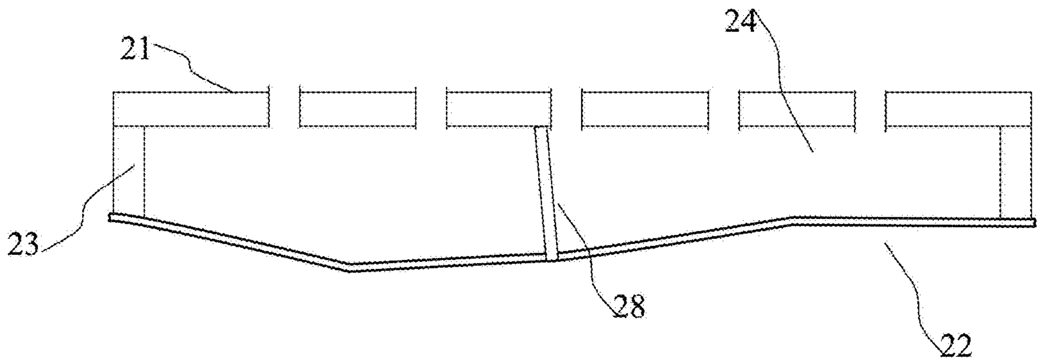
FIG. 11 shows a schematic diagram of the capacitive MEMS microphone according to yet another embodiment disclosed herein.
Figure 12:
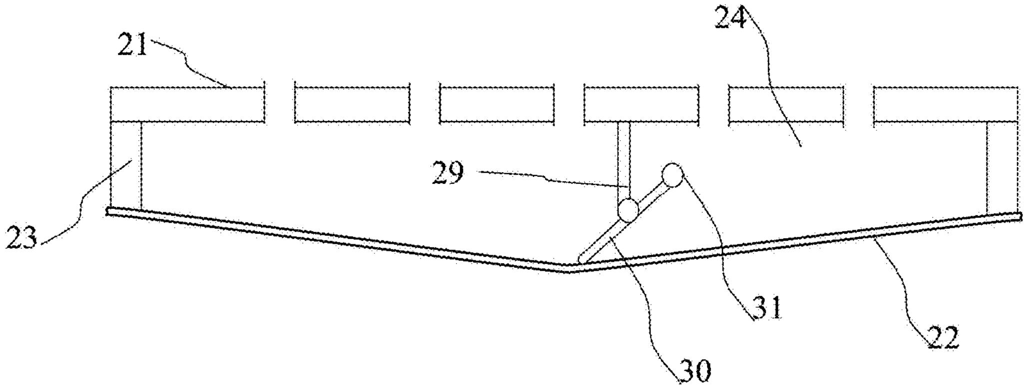
FIG. 12 shows a schematic diagram of a microphone unit according to one embodiment disclosed herein.

FIGS. 11 and 12 show an embodiment in which the diaphragm is pre-deviated by a support structure.

In the embodiment of FIG. 11, a support 28 is located between the diaphragm and the back electrode plate. One end of the support 28 is fixed to the back electrode plate 21, and the other end of the support 28 is fixed to the diaphragm 22 and separates the diaphragm 22 into at least two portions. During processing, the support 28 may be deformed due to stress, and thus is tilted. The deformation of the support 28 causes one of the at least two portions of the diaphragm to deviate outwardly relative to the back electrode plate 21 and the other portion to deviate inwardly relative to the back electrode plate 21, as shown in FIG. 11. In this way, it is possible for the diaphragm to produce deviation in two different directions, and the deviation in two different directions can balance the performance of the diaphragm.

Further, in order to reduce parasitic capacitance, the support 28 may be a columnar body.

In the example of FIG. 11, a support 29 is located between the diaphragm 22 and the back electrode plate 21. One end of the support 29 is fixed to the back electrode plate, and the other end of the support 29 supports an upwarped element 30. A first side of the upwarped element 30 is in contact with the diaphragm 22, and a second side of the upwarped element 30 has an electrostatic circuit 31. When an operating bias is applied, the electrostatic circuit 31 is attracted by the back electrode plate 21, so that the first side of the upwarped element 30 pushes the diaphragm to bulge outwardly, as shown in FIG. 12. In this way, it is possible to control the degree to which the diaphragm is pre-deviated by controlling the quantity of electricity in the electrostatic circuit 31.

Figure 13:
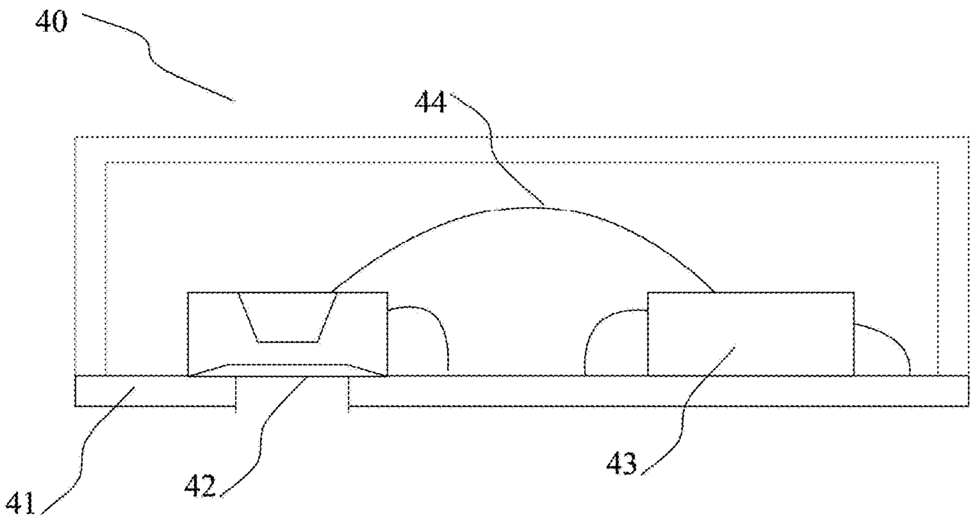
FIG. 13 shows a schematic diagram of an electronic device according to one embodiment disclosed herein.

FIG. 13 shows a schematic diagram of a microphone unit according to one embodiment disclosed herein.

As shown in FIG. 13, the microphone unit 40 includes a unit shell 41, the capacitive MEMS microphone 42 described above, and an integrated circuit chip 43. The capacitive MEMS microphone 42 and the integrated circuit chip 43 are provided in the unit shell 41. The capacitive MEMS microphone 42 corresponds to an air inlet of the unit shell 41. The circuits in the capacitive MEMS microphone 42, the integrated circuit chip 43 and the unit shell 41 are connected through leads 44.

Figure 14:
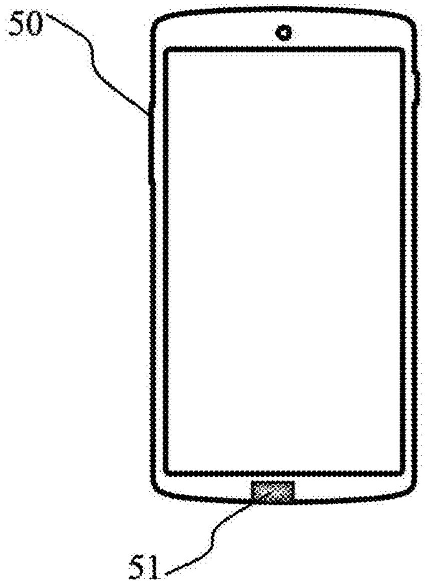
FIG. 14 shows a schematic diagram of a microphone unit according to one embodiment disclosed herein.

FIG. 14 shows a schematic diagram of a microphone unit according to one embodiment disclosed herein.

As shown in FIG. 14, the electronic device 50 may include a microphone unit 51 shown in FIG. 8. The electronic device 50 may be mobile phones, tablets, monitoring devices, wearable devices, etc.

The above is only the specific implementation of the embodiment of the present disclosure. It should be noted that for those of ordinary skill in the art, several improvements and modifications can also be made without departing from the principles of the embodiments of the present disclosure, and these improvements and modifications should also be regarded as the protection scope of the embodiments of the present specification.

The invention claimed is:

1. A capacitive MEMS microphone, comprising:
a back electrode plate;
a diaphragm; and
a spacer separating the back electrode plate from the diaphragm,
wherein in a state where no operating bias is applied, at least a portion of the diaphragm is pre-deviated in a direction away from the back electrode plate relative to a flat position, and
wherein a ratio of a first static effective displacement of the at least a portion of the diaphragm that is pre-deviated to a thickness of the diaphragm is greater than or equal to 0.2 and less than or equal to 3.

2. The capacitive MEMS microphone of claim 1, wherein in a state where the operating bias is applied but no sound pressure is not applied, a ratio of a second static effective displacement of the diaphragm relative to the flat position to a thickness of the diaphragm is greater than or equal to 0.5.

3. The capacitive MEMS microphone of claim 2, wherein the ratio of the second static effective displacement to the thickness of the diaphragm is greater than or equal to 1.

4. The capacitive MEMS microphone of claim 1, wherein at least a portion of the diaphragm is pre-deviated with a stress structure.

5. The capacitive MEMS microphone of claim 4, wherein the stress structure is selecting from the group consisting of:
a stress ring disposed on periphery of the diaphragm;
a corrugated membrane disposed on periphery of the diaphragm; and
a complex membrane structure disposed on the diaphragm.

6. The capacitive MEMS microphone of claim 4, wherein the stress structure includes a support located between the diaphragm and the back electrode plate, a first end of the support is fixed to the back electrode plate, a second end of the support is fixed to the diaphragm and separates the diaphragm into at least two portions, and deformation of the support causes one of the at least two portions of the diaphragm to deviate outwardly relative to the back electrode plate and the other portion to deviate inwardly relative to the back electrode plate.

7. The capacitive MEMS microphone of claim 4, wherein the stress structure includes a support located between the diaphragm and the back electrode plate, a first of the support is fixed to the back electrode plate, a second end of the support supports an upwarped element wherein a first side thereof is in contact with the diaphragm and wherein a second side thereof has an electrostatic circuit, and when an operating bias is applied, the electrostatic circuit is attracted by the back electrode plate so that the first side of the upwarped element pushes the diaphragm to bulge outwardly.

8. A microphone unit, comprising a unit shell, the capacitive MEMS microphone of claim 1 and an integrated circuit chip, wherein the capacitive MEMS microphone and the integrated circuit chip are provided in the unit shell.

9. An electronic device, comprising the microphone unit of claim 8.

* * * * *